No. 650,903. Patented June 5, 1900.
M. McCONNELL.
PLOW ATTACHMENT.
(Application filed Sept. 25, 1899.)
(No Model.)
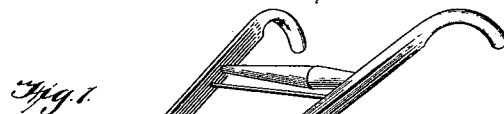
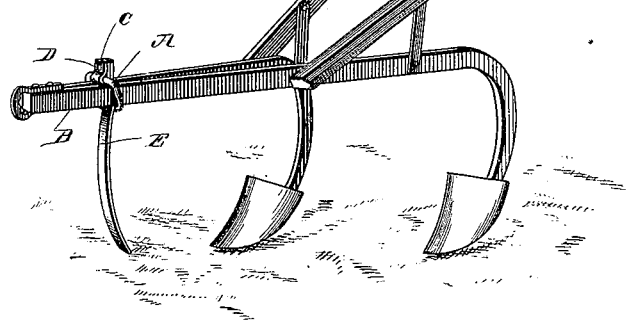
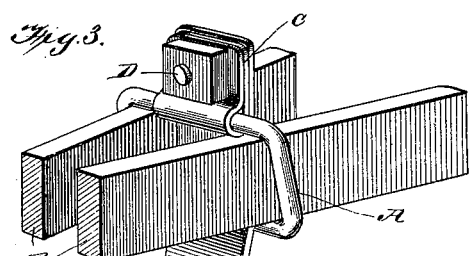
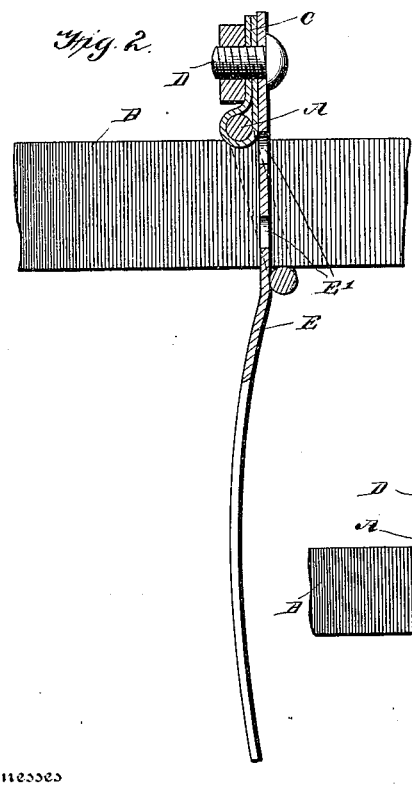
Witnesses
W. C. Lunsford
Chas. E. Brock
Inventor
M. McConnell,
by O'Meara & Co.
Attorneys

UNITED STATES PATENT OFFICE.

MELVIN McCONNELL, OF WAKATOMICA, OHIO.

PLOW ATTACHMENT.

SPECIFICATION forming part of Letters Patent No. 650,903, dated June 5, 1900.

Application filed September 25, 1899. Serial No. 731,639. (No model.)

*To all whom it may concern:*

Be it known that I, MELVIN MCCONNELL, a citizen of the United States, residing at Wakatomica, in the county of Coshocton and State of Ohio, have invented a new and useful Improvement in Plow Attachments, of which the following is a specification.

This invention is an improved plow attachment, the object being to provide a simple and efficient device which can be attached to a double-shovel plow or cultivator for the purpose of gaging the same.

With this object in view the invention consists, essentially, of a ring adapted to encircle the plow-beams adjacent to their forward ends and provided with means for securing a spring gage-bar in such a manner that the said bar will rest or travel upon the ground while the plow or cultivator is being drawn forwardly and will swing forwardly when the plow or cultivator is drawn backward, thereby preventing the said gage-bar sticking in the ground.

The invention consists also in the peculiar construction of the various parts and in their novel combination and arrangement, all of which will be fully described hereinafter and pointed out in the claims.

In the drawings forming part of this specification, Figure 1 is a perspective view of a cultivator provided with my attachment. Fig. 2 is a vertical sectional view, partly in elevation. Fig. 3 is a detail perspective view enlarged. Fig. 4 is a vertical sectional view showing the slight modification in which the spring gage-bar is composed of a plurality of strips.

In the practical application of my invention I employ a ring A, which is essentially rectangular in shape and may therefore be termed an "open frame," the said ring embracing the forward ends of the plow-beams B adjacent to their forward ends, and secured to the upper member of the ring A is a clip C, both members of which are perforated to receive the bolt D, by means of which the spring gage-bar E is secured, said gage-bar passing down through the ring A and reaching to the ground, the lower portion of the said bar being curved, as shown, in order to slide upon the surface of the ground, and inasmuch as the bar bears against the lower member of the frame upon the forward side it will be readily understood that its rearward movement is limited; but when the plow or cultivator is drawn backwardly for the purpose of turning around the spring-bar will swing forwardly, thereby preventing the lower end sticking in the ground. It will also be noted that the bar is provided with a series of bolt-holes E', by means of which it can be adjusted vertically, as described. A nut securely fastens a clip-bolt and spring-bar together.

Having thus fully described my invention, what I claim as new, and desire to secure by Letters Patent of the United States, is—

1. A plow attachment, comprising a rectangular-shaped ring in combination with a spring gage-bar passing upwardly through the said ring, and pivotally secured to the upper member, substantially as shown and described.

2. In a plow attachment, comprising a rectangular-shaped ring adapted to encircle the plow-beams adjacent to their forward ends, and the spring gage-bar pivotally secured to the upper member of the ring, said spring-bar being arranged between the plow-beams and within the ring, substantially as and for the purpose described.

3. A plow attachment comprising an essentially rectangular-shaped ring adapted to encircle the plow-beams adjacent to their forward ends, a clip secured upon the upper member of the ring and projected upwardly therefrom, and the spring gage-bar passing through the said ring, and secured at its upper end, to the clip, said gage-bar bearing against the forward edge of the lower member of the ring, substantially as shown and for the purpose described.

MELVIN McCONNELL.

Witnesses:
S. L. HOWELL,
WM. A. CLARK.